(12) United States Patent
Grey et al.

(10) Patent No.: US 12,730,305 B2
(45) Date of Patent: Sep. 8, 2026

(54) WAVEGUIDE FOR AN AUGMENTED REALITY OR VIRTUAL REALITY DISPLAY

(71) Applicant: Snap Inc., Santa Monica, CA (US)

(72) Inventors: David James Grey, Maidenhead (GB); Mohmed Salim Valera, Sutton Coldfield (GB)

(73) Assignee: Snap Inc., Santa Monica, CA (US)

( * ) Notice: Subject to any disclaimer, the term of this patent is extended or adjusted under 35 U.S.C. 154(b) by 854 days.

(21) Appl. No.: 17/964,719

(22) Filed: Oct. 12, 2022

(65) Prior Publication Data

US 2023/0032474 A1 Feb. 2, 2023

Related U.S. Application Data

(63) Continuation of application No. 16/497,534, filed as application No. PCT/GB2018/050697 on Mar. 16, 2018, now Pat. No. 11,487,111.

(30) Foreign Application Priority Data

Mar. 30, 2017 (GB) ..................................... 1705160

(51) Int. Cl.
*G02B 27/01* (2006.01)
*F21V 8/00* (2006.01)
(Continued)

(52) U.S. Cl.
CPC ....... *G02B 27/0101* (2013.01); *G02B 6/0016* (2013.01); *G02B 6/0036* (2013.01); *G02B 27/4205* (2013.01); *G02B 2006/12107* (2013.01)

(58) Field of Classification Search
CPC .... G02B 27/01–0189; G02B 2027/0105–0198
See application file for complete search history.

(56) References Cited

U.S. PATENT DOCUMENTS 11,487,111 B2 11/2022 Grey et al.
2006/0126181 A1 6/2006 Levola
(Continued)

FOREIGN PATENT DOCUMENTS

AU 2018244635 8/2019
CN 101019052 A 8/2007
(Continued)

OTHER PUBLICATIONS

"Canadian Application Serial No. 3,051,035, Examiners Rule 86(2) Report mailed Aug. 30, 2023", 4 pgs.
(Continued)

*Primary Examiner* — Christopher A Lamb, II
(74) *Attorney, Agent, or Firm* — Schwegman Lundberg & Woessner, P.A.

(57) ABSTRACT

A waveguide is disclosed for use in an augmented reality or virtual reality display. The waveguide includes a plurality of optical structures exhibiting differences in refractive index from a surrounding waveguide medium. The optical structures are arranged in an array to provide at least two diffractive optical elements overlaid on one another in the waveguide. Each of the two diffractive optical elements is configured to receive light from an input direction and couple it towards the other diffractive optical element which can then act as an output diffractive optical element, providing outcoupled orders towards a viewer. The optical structures have a shape, when viewed in the plane of the waveguide, comprising a plurality of substantially straight sides having respective normal vectors at different angles and this can effectively reduce the amount of light that is coupled out of the waveguide on first interaction with the optical structures.

20 Claims, 7 Drawing Sheets

(51) Int. Cl.
*G02B 6/12* (2006.01)
*G02B 27/42* (2006.01)

(56) References Cited

U.S. PATENT DOCUMENTS

| | | | | |
|---|---|---|---|---|
| 2010/0321781 | A1* | 12/2010 | Levola | G02B 27/4272 359/569 |
| 2014/0126239 | A1 | 5/2014 | Huang et al. | |
| 2016/0216416 | A1 | 7/2016 | Tekolste et al. | |
| 2017/0034435 | A1 | 2/2017 | Vallius | |
| 2017/0059879 | A1 | 3/2017 | Vallius | |
| 2017/0299794 | A1* | 10/2017 | Fattal | G06F 3/0428 |
| 2019/0056591 | A1* | 2/2019 | Tervo | G02B 6/0038 |
| 2019/0317270 | A1* | 10/2019 | Tammela | G02B 6/0026 |
| 2020/0110261 | A1 | 4/2020 | Grey et al. | |

FOREIGN PATENT DOCUMENTS

| | | |
|---|---|---|
| CN | 101859004 A | 10/2010 |
| CN | 101887145 A | 11/2010 |
| CN | 102590949 A | 7/2012 |
| CN | 103645540 A | 3/2014 |
| TW | 201300834 A | 1/2013 |
| WO | WO-2016020643 A1 | 2/2016 |
| WO | WO-2018178626 A1 | 10/2018 |

OTHER PUBLICATIONS

"Canadian Application Serial No. 3,051,035, Response filed Nov. 10, 2023 to Examiners Rule 86(2) Report mailed Aug. 30, 2023", w/ English claims, 19 pgs.
"European Application Serial No. 18714058.7, Response filed Apr. 3, 2020 to Communication pursuant to Rules 161(1) and 162 EPC mailed Nov. 7, 2019", 7 pgs.
"Indian Application Serial No. 201947039533, First Examination Report mailed Aug. 2, 2021", 7 pgs.
"Indian Application Serial No. 201947039533, Response filed Feb. 1, 2022 to First Examination Report mailed Aug. 2, 2021", 18 pgs.
"Israel Application Serial No. 268926, First Office Action mailed Jul. 11, 2024", W/English Translation, 7 pgs.
"Israel Application Serial No. 268926, Response Filed Sep. 23, 2024 to First Office Action mailed Jul. 11, 2024", 15 pgs.
"Israell Application Serial No. 268926, Office Action mailed Jun. 12, 2023", w/ English Translation, 8 pgs.
"Malaysian Application Serial No. PI2019005660, Office Action mailed Jul. 24, 2023", 3 pgs.
"Taiwanese Application Serial No. 107111105, Office Action mailed Nov. 3, 2021", w/ English machine translation, 12 pgs.
"Taiwanese Application Serial No. 107111105, Response filed Jan. 24, 2022 to Office Action mailed Nov. 3, 2021", w/ English machine translation, 22 pgs.
"Australian Application Serial No. 2018244635, Response filed May 27, 2022 to First Examination Report mailed Mar. 25, 2022", 18 pgs.
"Australian Application Serial No. 2018244635, Second Examination Report mailed Jun. 23, 2022", 3 pgs.
"Australian Application Serial No. 2018244635, Response filed Aug. 19, 2022 to Second Examination Report mailed Jun. 23, 2022", 17 pgs.
"Israeli Application Serial No. 268926, First Office Action mailed Sep. 1, 2022", w/ English Translation, 6 pgs.
"Brazilian Application Serial No. BR112019015632-1, Office Action mailed Sep. 9, 2022", w/ English Machine Translation, 3 pgs.
"Korean Application Serial No. KR 20200002791, Office Action mailed Jun. 13, 2022", w/ English Translation, 11 pgs.
U.S. Appl. No. 16/497,534, filed Sep. 25, 2019, Waveguide for an Augmented Reality or Virtual Reality Display.
"Japanese Application Serial No. 2019-540647, Notification of Reasons for Refusal mailed Dec. 7, 2021", w/ English Translation, 6 pgs.
"Japanese Application Serial No. 2019-540647, Response filed Feb. 1, 2022 to Notification of Reasons for Refusal mailed Dec. 7, 2021", w/ English Translation, 9 pgs.
"U.S. Appl. No. 16/497,534, Corrected Notice of Allowability mailed Jul. 15, 2022", 2 pgs.
"U.S. Appl. No. 16/497,534, Corrected Notice of Allowability mailed Sep. 28, 2022", 2 pgs.
"U.S. Appl. No. 16/497,534, Examiner Interview Summary mailed Apr. 22, 2022", 3 pgs.
"U.S. Appl. No. 16/497,534, Final Office Action mailed Feb. 23, 2022", 16 pgs.
"U.S. Appl. No. 16/497,534, Non Final Office Action mailed Oct. 6, 2021", 14 pgs.
"U.S. Appl. No. 16/497,534, Notice of Allowance mailed Jun. 29, 2022", 9 pgs.
"U.S. Appl. No. 16/497,534, Preliminary Amendment filed Sep. 25, 2019", 6 pgs.
"U.S. Appl. No. 16/497,534, Response filed Apr. 25, 2022 to Final Office Action mailed Feb. 23, 2022", 12 pgs.
"U.S. Appl. No. 16/497,534, Response filed Dec. 17, 2021 to Non Final Office Action mailed Oct. 6, 2021", 13 pgs.
"Australian Application Serial No. 2018244635, First Examination Report mailed Mar. 25, 2022", 3 pgs.
"International Application Serial No. PCT/GB2018/050697, International Preliminary Report on Patentability mailed Apr. 11, 2019", 7 pgs.
"International Application Serial No. PCT/GB2018/050697, International Search Report mailed May 28, 2018", 3 pgs.
"International Application Serial No. PCT/GB2018/050697, Written Opinion mailed May 28, 2018", 7 pgs.
"Korean Application Serial No. 10-2019-7025571, Office Action mailed Jun. 13, 2022", w/ English Translation, 11 pgs.
Chang, K, et al., "Photonic band gaps of polygonal and circular dielectric rods in square lattices", Journal Of Applied Physics, American Institute Of Physics, US, vol. 104, No. 11, (Dec. 4, 2008), 113109-113109.
Erdiven, Utku, et al., "Design and performance of novel communication system using two-dimensional photonic crystals", Optik, Wissenschaftliche Verlag GMBH, DE, vol. 126, No. 19, (May 27, 2015), 2044-2049.
Huang, Yin, et al., "A Defect Effect to Light Transmission through Acute Bending Coupled Cavity Waveguide in a Two-Dimensional Photonic Crystal", Chinese Physics Letters, Institute of Physics Publishing, Bristol, GB, vol. 26, No. 4, (Apr. 1, 2009), 4 pgs.
Jiang, B, et al., "The optimization of large gap-midgap ratio photonic crystal with improved Bisection-Particle Swarm Optimization", Optics Communications, Elsevier, Amsterdam, NL, vol. 284, No. 1, (Jan. 1, 2011), 226-230.
Liu, W-L, et al., "Band gap studies of 2D photonic crystals with hybrid scatterers", Physica B: Condensed Matter, Elsevier, Amsterdam, NL, vol. 404, No. 21, (Nov. 15, 2009), 4237-4242.
Stelson, Angela C, et al., "Photonic crystal properties of self-assembled Archimedean tilings", Journal of Applied Physics, American Institute of Physics, US, vol. 121, No. 2, [retrieved on Jan. 9, 2017], (Jan. 9, 2017), 9 pgs.
Wang, Rongzhou, et al., "Effects of shapes and orientations of scatterers and lattice symmetries on the photonic band gap in two-dimensional photonic crystals", Journal of Applied Physics, American Institute of Physics, US, vol. 90, No. 9, (Nov. 1, 2001), 4307-4313.
"Israel Application Serial No. 323135, Office Action mailed Sep. 14, 2025", w/ English Translation, 5 pgs.
"Israel Application Serial No. 323135, Office Action mailed May 14, 2026", w/ English translation, 13 pgs.

* cited by examiner 50
52
54
64
60
40
42
34
30
85
82
22
26
82
84
80
20
24
70
10
16
p
Y AXIS
X AXIS

WAVEGUIDE FOR AN AUGMENTED REALITY OR VIRTUAL REALITY DISPLAY

This application is a continuation of U.S. patent application Ser. No. 16/497,534, filed on Sep. 25, 2019, which is a U.S. national-phase application filed under 35 U.S.C. § 371 from International Application Serial No. PCT/GB2018/050697, filed on Mar. 16, 2018, and published as WO 2018/178626 on Oct. 4, 2018, which claims the benefit of priority to United Kingdom Application Serial No. 1705160.8, filed on Mar. 30, 2017, each of which are incorporated herein by reference in their entireties.

The present invention relates to a waveguide for use in an augmented reality or virtual reality display. In particular, the invention relates to a waveguide in which input light is expanded in two orthogonal directions in an output element and is coupled out of a waveguide towards a viewer. This can allow physical expansion of the eyebox in an augmented reality display.

An augmented reality display allows a user to view their surroundings as well as projected images. In military or transportation applications the projected images can be overlaid on the real world perceived by the user. Other applications for these displays include video games and wearable devices, such as glasses.

In a normal augmented reality set-up a transparent display screen is provided in front of a user so that they can continue to see the physical world. The display screen is typically a glass waveguide, and a projector is provided to one side. Light from the projector is coupled into the waveguide by a diffraction grating. The projected light is totally internally reflected within the waveguide. The light is then coupled out of the waveguide by another diffraction grating so that it can be viewed by a user. The projector can provide information and/or images that augment a user's view of the physical world.

An optical device is disclosed in WO 2016/020643 for expanding input light in two dimensions in an augmented reality display. An input diffractive optical element is provided for coupling input light from a projector into a waveguide. The optical device also includes an output element having two diffractive optical elements overlaid on one another in the waveguide so that each of the two diffractive optical elements can receive light from the input diffractive optical element and couple it towards the other diffractive optical element in the pair, which can then act as an output diffractive optical element which couples light out of the waveguide towards a viewer. In one embodiment the two diffractive optical elements overlaid on one another are provided in a photonic crystal. This is achieved by having an array of pillars arranged within or on the surfaces the waveguide, having an increased refractive index relative to the surrounding waveguide medium. The pillars in WO 2016/020643 are described as having a circular cross-sectional shape when viewed in the plane of the waveguide, from the perspective of a viewer. This arrangement has been found to be very effective at simultaneously expanding light in two dimensions and coupling light out of the waveguide. Advantageously this can improve the use of space on the waveguide which can decrease the cost of manufacture.

An issue has been identified with known waveguides because a central strip in the output image has been observed as having a higher relative brightness than other parts. This "striping" effect is undesirable for users, and an object of the present invention is to overcome and mitigate this issue.

According to an aspect of the invention there is provided a waveguide for use in an augmented reality or virtual reality display, comprising: a plurality of optical structures; wherein the plurality of optical structures are arranged in an array to provide at least two diffractive optical elements overlaid on one another in the waveguide, wherein each of the two diffractive optical elements is configured to receive light from an input direction and couple it towards the other diffractive optical element which can then act as an output diffractive optical element, providing outcoupled orders towards a viewer; wherein at least one of the plurality of optical structures has a shape, when viewed in the plane of the waveguide, having a plurality of substantially straight sides having respective normal vectors at different angles.

In this way, it has been found that the waveguide can reduce the proportion of light that is diffracted into an order which causes the striping effect. This can improve the diffraction efficiency of the overlaid diffractive optical elements, increasing the proportion of light that is turned and coupled towards the other diffractive optical element. This can mitigate the striping effect that has been observed with known waveguides having optical structures with a circular cross-sectional shape. This can also improve the overall efficiency of the waveguide by controlling the light coupled towards a user for viewing.

The at least one optical structure may have a polygonal shape. Thus, the at least one optical structure may include at least one vertex. There may be at least four substantially straight sides, and possibly five, six or more substantially straight sides joined by vertices.

The at least one vertex may represent a rounded edge. It is believed that any practical implementation would involve rounded edges, at least to some degree.

The at least one optical structure may include at least one axis of symmetry which is substantially perpendicular to the input direction. The at least one axis of symmetry may be substantially parallel to the input direction. The optical structure may have at least two axes of symmetry, which are perpendicular to one another.

The internal angle of each vertex may be less than 180°. This can improve the ease with which the optical structures can be manufactured since it may be more complicated to create optical structures having notches, or inwardly projecting inlets.

One of the sides may have a length that is a ratio of around 0.1 to 0.4 of the spacing of optical structures in the array. More preferably one of the sides has a length that is around 0.2 of the spacing of optical structures. The spacing of optical structures may otherwise be known as the lattice constant of the array.

The optical structure may include sides that are substantially parallel to the two respective diffractive optical elements. The sides may be angled at substantially ±30° to the input direction. It has been found that this arrangement can advantageously improve diffraction efficiency into the required orders and mitigate striping.

The waveguide may include an input diffractive optical element configured to couple light into the waveguide and to provide light to the plurality of optical structures in the array in the input direction. The input diffractive optical element is preferably a diffraction grating comprising grooves in one surface of the waveguide. Preferably the input grating has a high efficiency for coupling light into the waveguide.

The input direction may define an input axis, and the optical structures may have different shapes at positions which are tangentially displaced from the input axis. The optical structures may have shapes that aim to reduce transmission in the order which causes the striping effect, where they are aligned with the input axis. This may be less important at positions that are displaced from the input axis and therefore optical structures at the sides of the array may have a different shape.

The array of optical structures in the waveguide may be referred to as a photonic crystal. The waveguide may be provided within an optical display.

The optical structures preferably exhibit differences in refractive index from a surrounding waveguide medium. In this way, the optical structures can be embedded within a waveguide and their diffractive properties can be created due to a difference in refractive index between the structures and the waveguide medium.

The optical structures may be provided as surface relief features on a surface of the waveguide. The mismatch between the refractive index of the surface relief features and the air that surrounds them may provide the desired diffractive properties. In some embodiments a coating may be provided on the optical structures in order to control diffraction efficiency.

According to another aspect of the invention there is provided a method of manufacture of a waveguide for an augmented reality or virtual reality display, comprising the steps of: providing a plurality of optical structures; arranging the plurality of optical structures in an array to provide at least two diffractive optical elements overlaid on one another in the waveguide, wherein each of the two diffractive optical elements is configured to receive light from an input direction and couple it towards the other diffractive optical element which can then act as an output diffractive optical element, providing outcoupled orders towards a viewer; and providing at least one of the plurality of optical structures with a shape, when viewed in the plane of the waveguide, having a plurality of substantially straight sides having respective normal vectors at different angles.

Embodiments of the invention are now described, by way of example, with reference to the drawings, in which.

Figure 1:
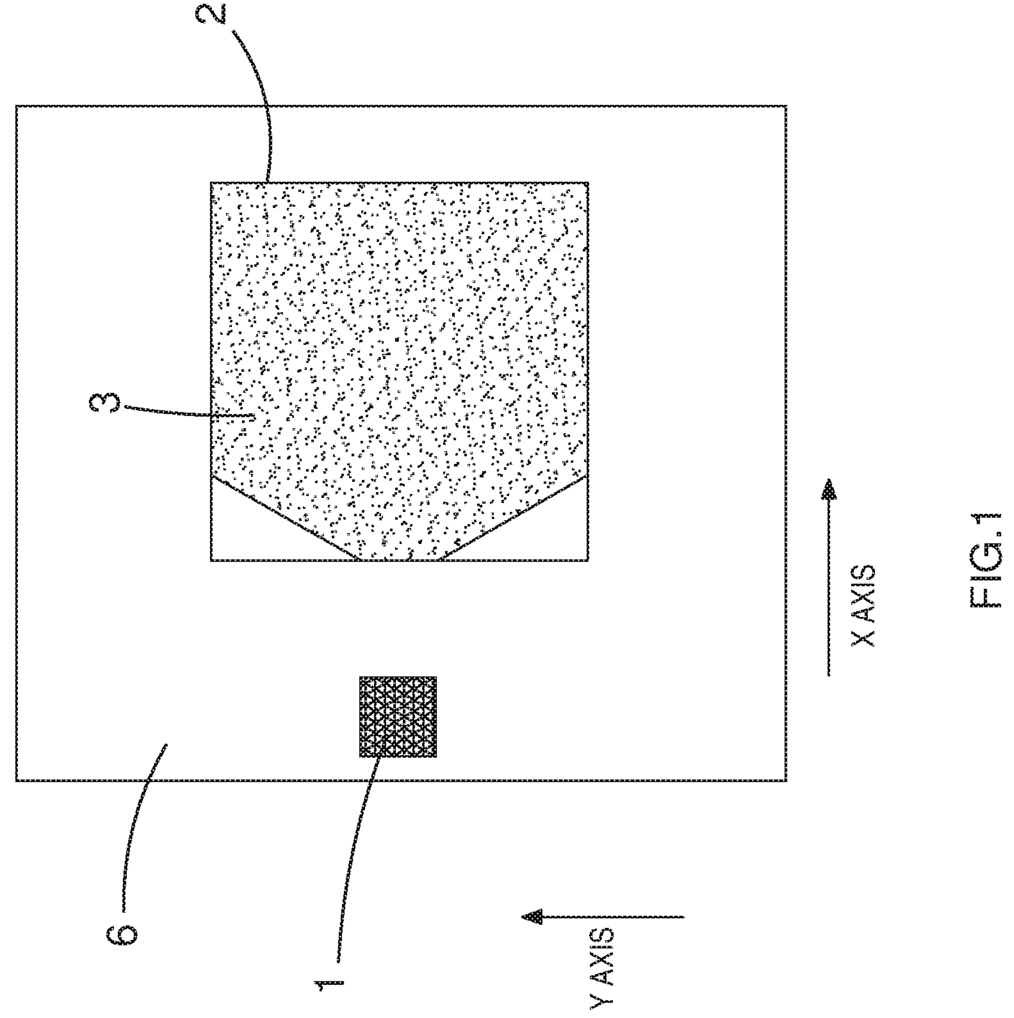
FIG. 1 is a top view of a known waveguide.
Figure 2:
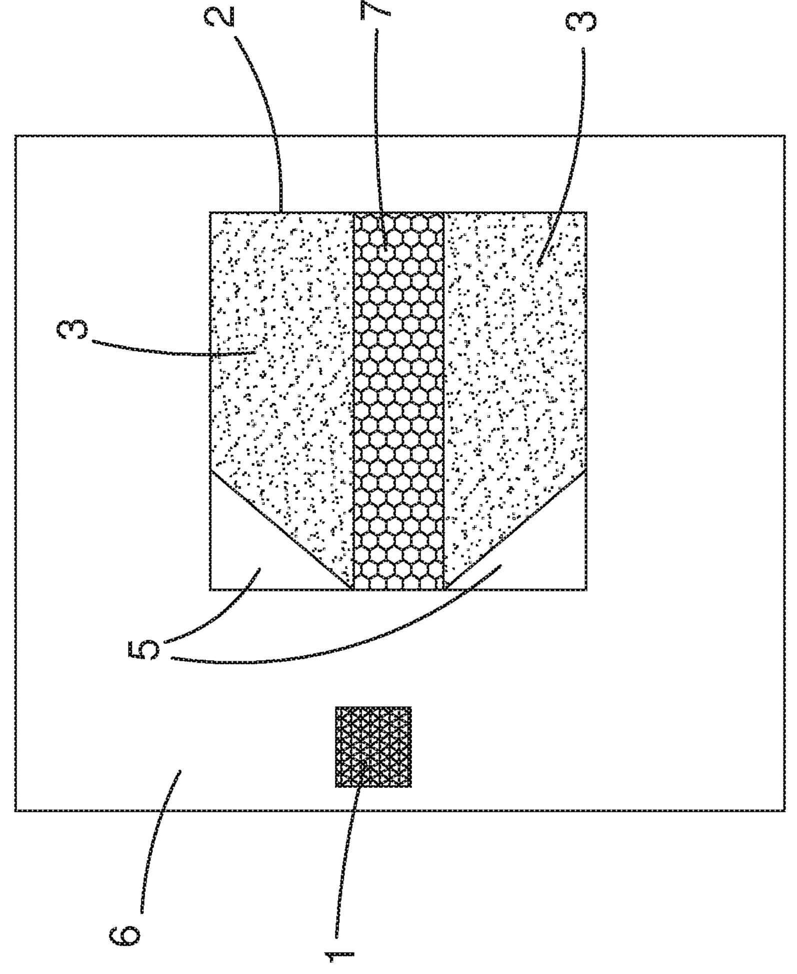
FIG. 2 is another top view of a known waveguide.

FIGS. 1 and 2 are top views of a known waveguide 6. An input diffraction grating 1 is provided on a surface of the waveguide 6 for coupling light from a projector (not shown) into the waveguide 6. Light that is coupled into the waveguide travels by total internal reflection towards an output element 2 which includes a photonic crystal 3. In this example the photonic crystal 3 includes pillars (not shown) having a circular cross-sectional shape from the perspective of these top views. The pillars have an different refractive index relative to the refractive index of the surrounding waveguide medium and they are arranged in an array having hexagonal symmetry.

When light encounters the photonic crystal 3 in the output element 2 from the input diffraction grating along the x-axis it is either transmitted or turned through ±60° by one of the diffractive optical structures formed by the array in the photonic crystal 3.

It has been found that the output image diffracted from element 2 includes a central stripe 7 which has a higher relative brightness than other parts. It is believed that this effect is created due to the diffraction efficiencies of the diffractive optical structures formed by the array in the photonic crystal 3. In particular, it is believed that a significant proportion of light received from the input diffraction grating 1 is diffracted to the eye when it encounters the photonic crystal 3, rather than being diffracted and turned through ±60°.

Figure 3:
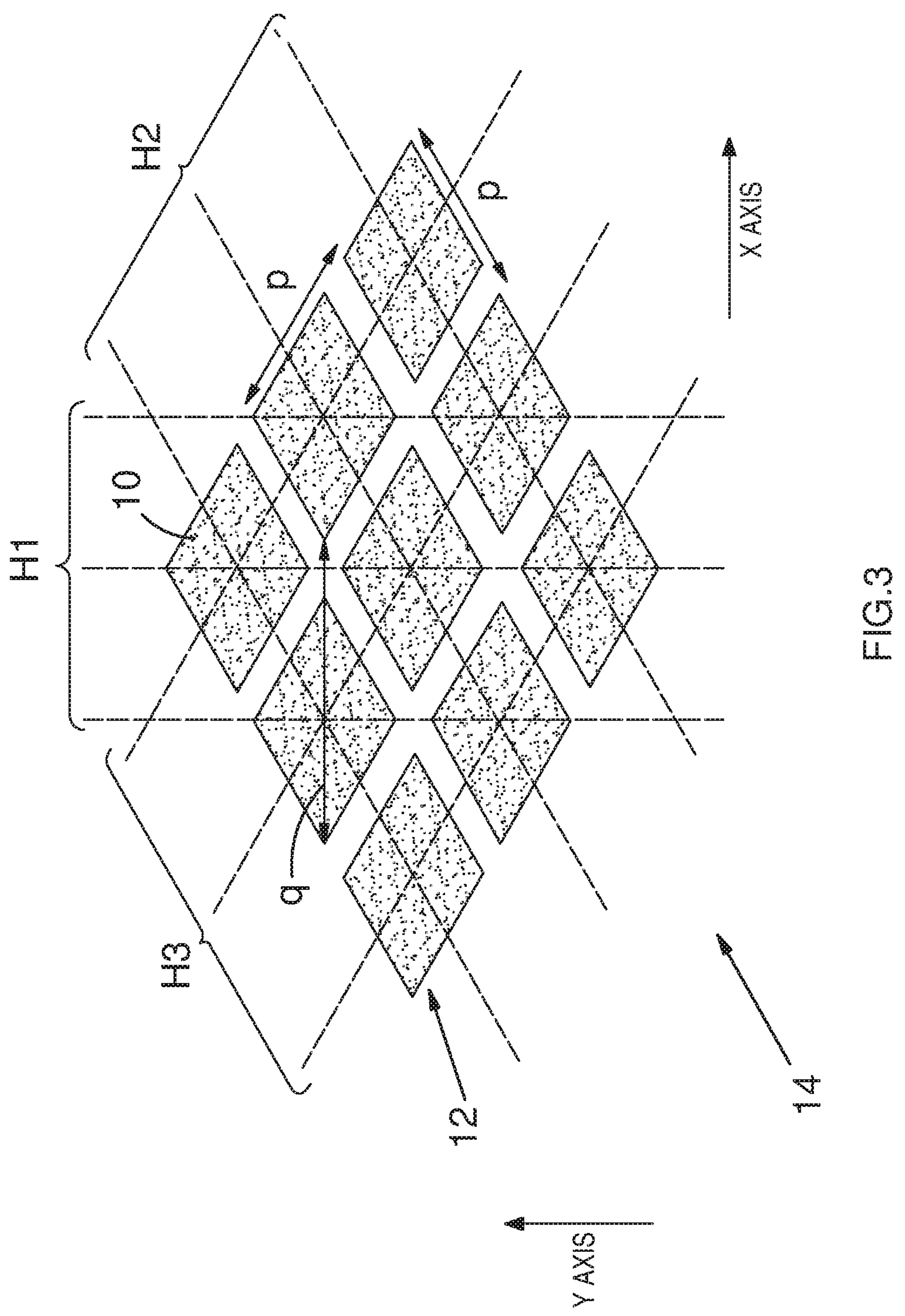
FIG. 3 is a top view of a photonic crystal for use in a waveguide in an embodiment of the invention.

FIG. 3 is a top view of part of a photonic crystal 12, which is an array of optical structures 10 that are provided within a waveguide 14. The waveguide 14 may have a low refractive index, with n~1.5. The optical structures 10 in this arrangement are parallelograms having four substantially straight sides and four vertices. The optical structures 10 have substantially the same cross-sectional shape across the width of the waveguide. In other embodiments the optical structures 10 may be provided across only a portion of the width of the waveguide 14.

In one embodiment the optical structures 10 can be provided on one surface of the waveguide 14. In this arrangement the optical structures 10 can have a feature height so that they project from the surface of the waveguide 14. It has been found that an effective photonic crystal can be created with feature height in the range of 30 nm to 200 nm. Air channels are formed in the valleys between the optical structures 10. The optical structures 10 can have the same refractive index as the waveguide medium with n~1.5. The optical structures 10 are surrounded by air with a refractive index, n=1, and this mismatch in refractive index can allow diffraction. The diffraction efficiency can be controlled by applying a thin film coating on the horizontal surfaces of the optical structures 10. The coating material would usually (but not always) have a higher refractive index than the waveguide 14. In one embodiment a coating is applied with a refractive index of n~2.4.

In another embodiment the optical structures 10 can be embedded within the waveguide 14 medium. The optical structures 10 can therefore be provided entirely within the waveguide 14 medium. This requires a refractive index mismatch between the optical structures 10 and the waveguide medium 14 in order for diffraction to occur. This can be achieved by creating a waveguide 14 having a surface relief profile with optical structures 10 on one surface. A bonding material can then be applied on the optical structures 10 and this can be bonded to a cover piece having the same refractive index as the waveguide 14. By choosing a bonding material that has a different (usually higher) refractive index than the waveguide medium 14 a unified waveguide 14 can be created between the original waveguide and the cover piece, with the bonding material sandwiched in between. In this design the bonding material has the same shape as the optical structures 10, but a different refractive index from the surrounding waveguide medium.

The regular arrangement of optical structures 10 in the array may be thought of as a number of effective diffraction gratings or diffractive optical structures. In particular it is possible to define a grating H1 with optical structures 10 aligned along the y-axis with adjacent rows of optical structures separated by a distance q. Grating H2 is arranged with rows of optical structures 10 at an angle of +30° to the x-axis, with adjacent rows separated by a distance p, known as the lattice constant. Finally, grating H3 is arranged with rows of optical structures at an angle of −30° to the x-axis, with adjacent rows separated by a distance p. The values p and q are related to one another by the expression q=2p Cos(30°). It has been found that an effective photonic crystal can be created with values of p in the range of 340 nm to 650 nm.

When light from an input grating received along the x-axis is incident on the photonic crystal 12 it undergoes multiple simultaneous diffractions by the various diffractive optical elements. Light can be diffracted into a zero order, which is a continuation of the propagation of the incident light. Light can also be diffracted into a first diffraction order by grating H1. The first order is coupled out of the waveguide 14 in a positive direction along the z-axis, towards a viewer which can be defined as the straight to eye order. Light can also be diffracted into a first diffracted order by the H2 diffractive optical structure. This first order is diffracted at +60° to the x-axis, and this light beam goes on to make further interactions with the photonic crystal. Light can also be diffracted into a first diffracted order by the H3 diffractive optical structure. This first order is diffracted at +60° to the x-axis, and this light beam goes on to make further interactions with the photonic crystal. A subsequent diffractive interaction with the H2 diffractive optical structure can couple light out of the waveguide 12 in the positive z-axis towards a viewer. Thus, light can be coupled out of the waveguide at each point, and yet light can continue to expand within the waveguide 12 in two dimensions. The symmetry of the photonic crystal means that every exit beam has the same angular and chromatic properties as the input beam, which means that a polychromatic (as well as a monochromatic) light source may be used as the input beam with this photonic crystal arrangement.

The photonic crystal can allow simultaneous and rapid expansion of light in two dimensions so that the input light can fill a two-dimensional display screen. This can allow an ultra-compact display because the waveguide size can be kept to a minimum due to the two-dimensional beam expansion.

In this arrangement the optical structures 10 have straight sides that are parallel to the diffractive optical structures H2, H3. Thus, the sides of the parallelograms are angled at ±30° to the x-axis, which is the direction along which input light is received from the input grating 1.

A surprising advantage has been found with non-circular optical structures 10, which is that the diffraction efficiencies of the diffractive optical structures H1, H2, H3 are significantly increased. This increases the proportion of light that is diffracted into the first orders by the structures H1, H2, H3, and decreases the proportion of light that is diffracted into the zero order, and which continues to propagate in the waveguide 12 by total internal reflection. This can reduce the striping effect which has been observed with circular structures, which significantly improves the utility of the waveguide 14.

Figure 4:
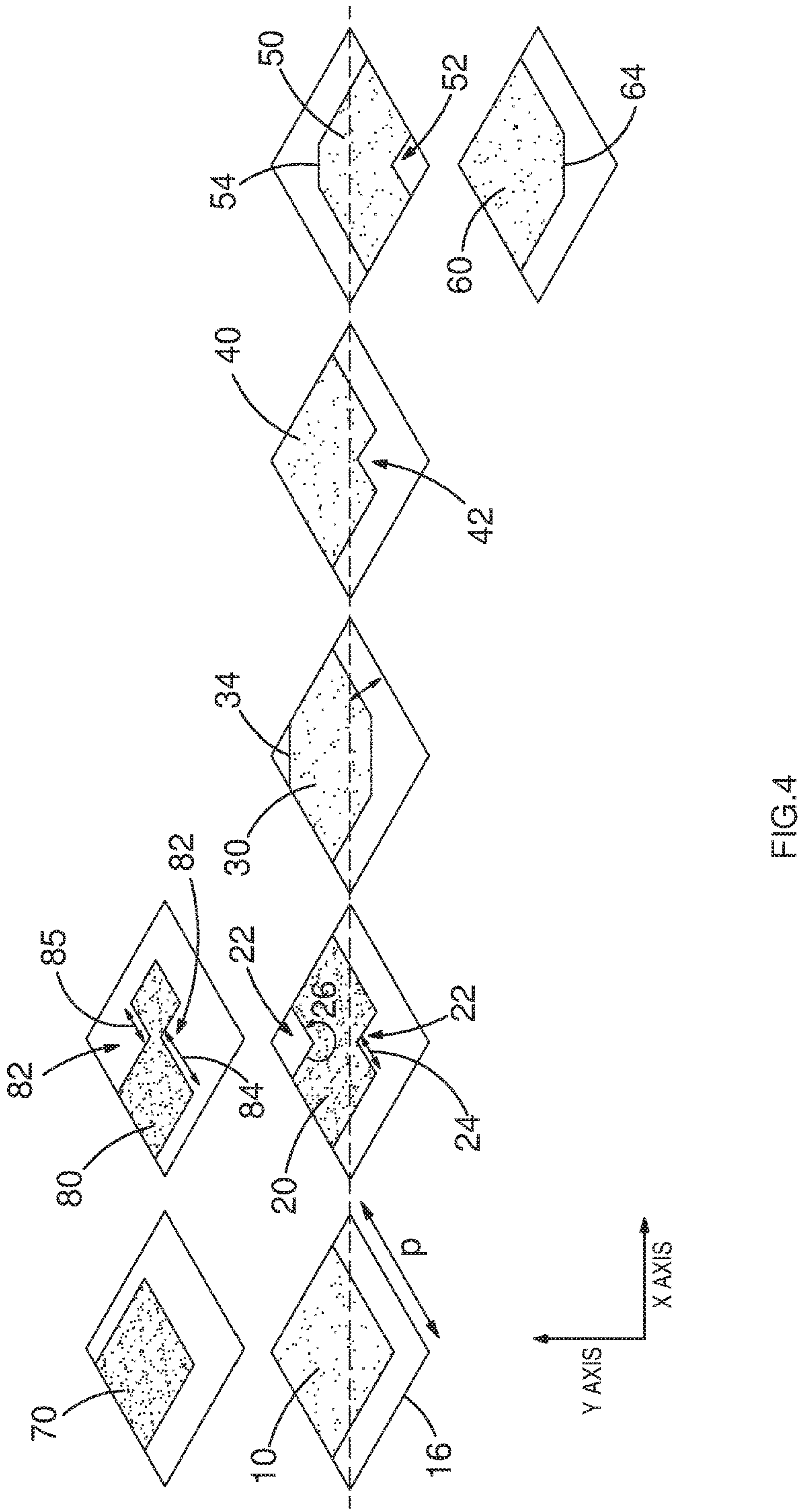
FIG. 4 shows a number of examples of optical structures with different shapes that can be used in a photonic crystal in a waveguide in an embodiment of the invention.

FIG. 4 shows a number of examples of other shapes for the optical structures 10 which can be used to further reduce the striping effect. A first optical structure 10 has a shape similar to that shown in FIG. 3. The first optical structure 10 is a simple parallelogram, shown within a larger parallelogram 16, which indicates the spacing of optical structures 10 within the photonic crystal 12. The upper and lower apexes have 120° angles. The lattice constant, p, is equal to the length of one of the sides of the larger parallelogram 16. A second optical structure 20 is a modified parallelogram having a pair of central notches 22. In this arrangement each notch 22 is formed of two sides which are parallel to respective main sides of the outer parallelogram and the diffractive optical structures H2, H3. A notch width 24 can be defined, and the notch width 24 can be varied in different embodiments. The notch 22 includes a vertex 26 having an internal angle which is larger than 180°. A third optical structure 30 is another modified parallelogram having two surfaces that are parallel to the x-axis. A "flat-sided" length 34 can be defined, which is the length of the side that is parallel to the x-axis; the flat sided length 34 can be varied in different embodiments. The third optical structure 30 has a plurality of vertices, each of which has an internal angle which is less than 180°. A fourth optical structure 40 is provided, which is similar to the second optical structure 20, but includes only one notch 42. A fifth optical structure 50 is provided having a notch 52 on one side and a flat portion 54 on the other side which is parallel to the x-axis. A sixth optical structure 60 is provided, which is similar to the third optical structure 30, but with only one "flat sided" length 64. A seventh optical structure 70 is provided with a similar shape to the first optical structure 10, but with a reduced size. An eighth optical structure 80 is provided with a similar shape to the second optical structure 20, having upper and lower notches 82. The notches 82 are defined by first and second notch widths 84, 85, where the second notch width 85 is larger than the first notch width 84. Thus, the eighth optical structure 80 has a shape composed of two similar and partially overlapping parallelograms of different size. The first, second, third and seventh optical structures 10, 20, 30, 70 have symmetry in x-axis and the y-axis. The fourth, fifth and sixth optical structures 40, 50, 60 have symmetry in the y-axis only. The eighth optical structure 80 has symmetry in the x-axis only.

In all of the optical structures shown in FIG. 4 the polygons include sides that are substantially parallel to the diffractive optical structures H1, H2 in the photonic crystal 12. However, other viable embodiments are envisaged where the optical structures have sides that are non-parallel to the structures H1, H2.

Vertices are present in all of the optical structures shown in FIG. 4. In practice these vertices would have slightly rounded corners, depending on the degree of magnification that is used when they are examined.

Figure 5:
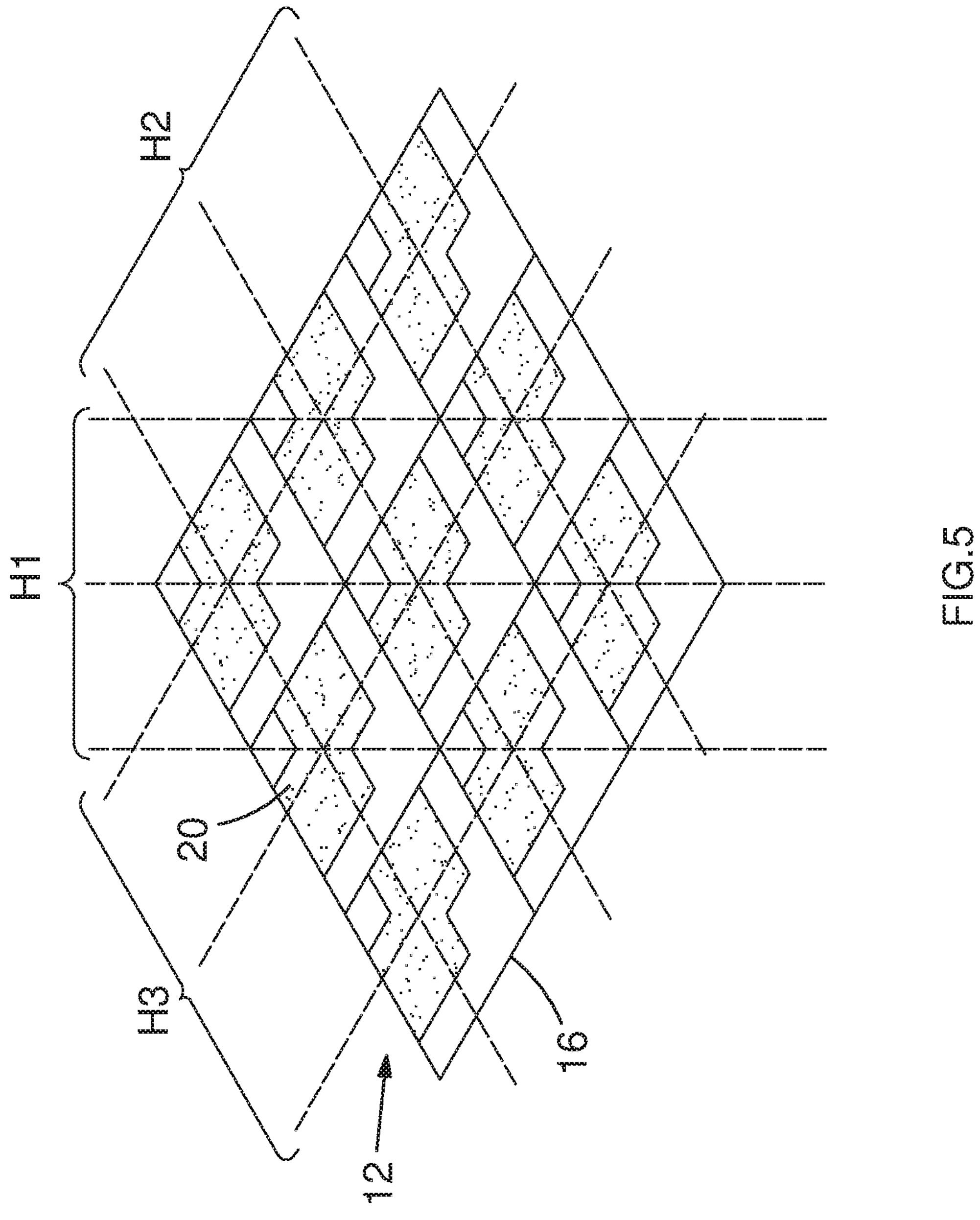
FIG. 5 is a top view of a photonic crystal for use in a waveguide in an embodiment of the invention.

FIG. 5 is an example of a photonic crystal 12 with a regular array of the second optical structures 20.

Figure 6:
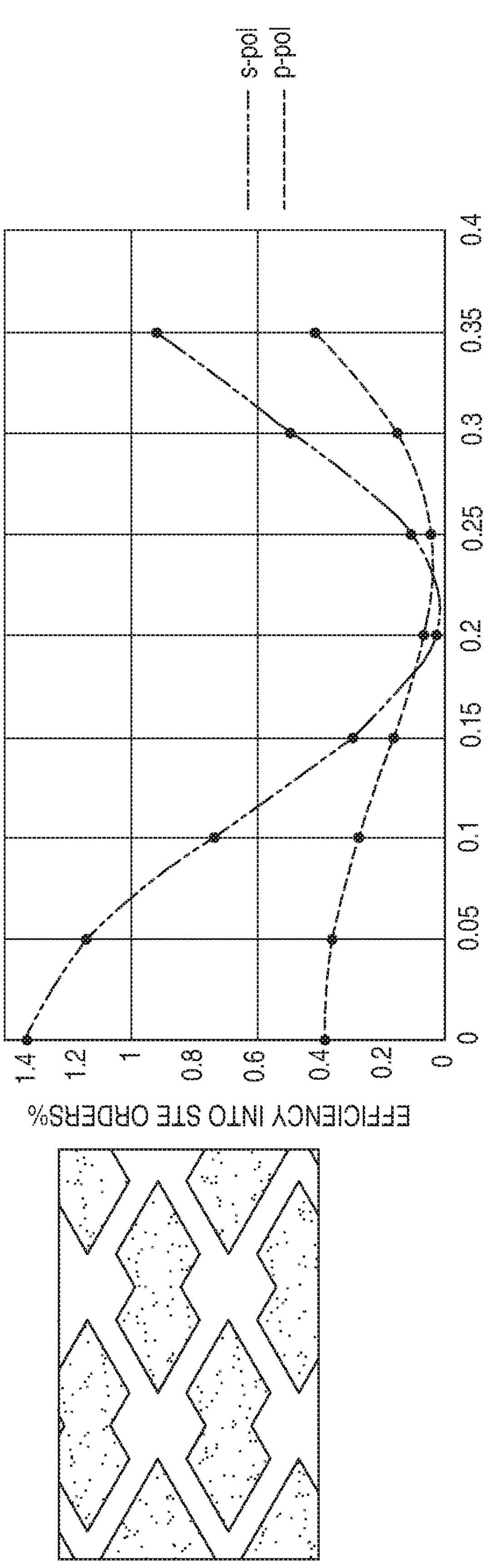
FIG. 6 is a graph showing how diffraction efficiency varies with notch width for an optical structure with a particular shape, in an embodiment of the invention.

FIG. 6 is a graph showing the efficiency with which light is coupled into the straight to eye order when it interacts with the photonic crystal 12 as shown in FIG. 5, formed by an array of the second optical structures 20. The graph shows how the efficiency of the straight to eye order varies when the notch width 24 is varied (while maintaining symmetry in the x-axis and the y-axis). The efficiency is plotted for the s-polarisation and p-polarisation. In this graph the s-polarisation has the higher efficiency when the notch width is zero. It is noted that a notch width of zero would actually correspond to the simple parallelogram shape of the first optical structure 10. It can be seen that the straight to eye diffraction efficiency is reduced to a minimum when the notch width 24 is in the range of 0.15 to 0.25 of the lattice constant, p. In practice, the lattice constant, p, is selected in part based on the central wavelength of light that is intended for use in the waveguide.

It is evident from FIG. 6 that effective suppression of light that is coupled into the straight to eye order can be achieved through the use of a photonic crystal with a regular array of the second optical structures, as shown in FIG. 5, where the notch width 24 is in the range of 0.15 to 0.25 of the lattice constant, p. In practice, it may be desirable to avoid reducing the efficiency entirely to zero, otherwise an absence of light may create an effective dark stripe in the output image.

Figure 7:
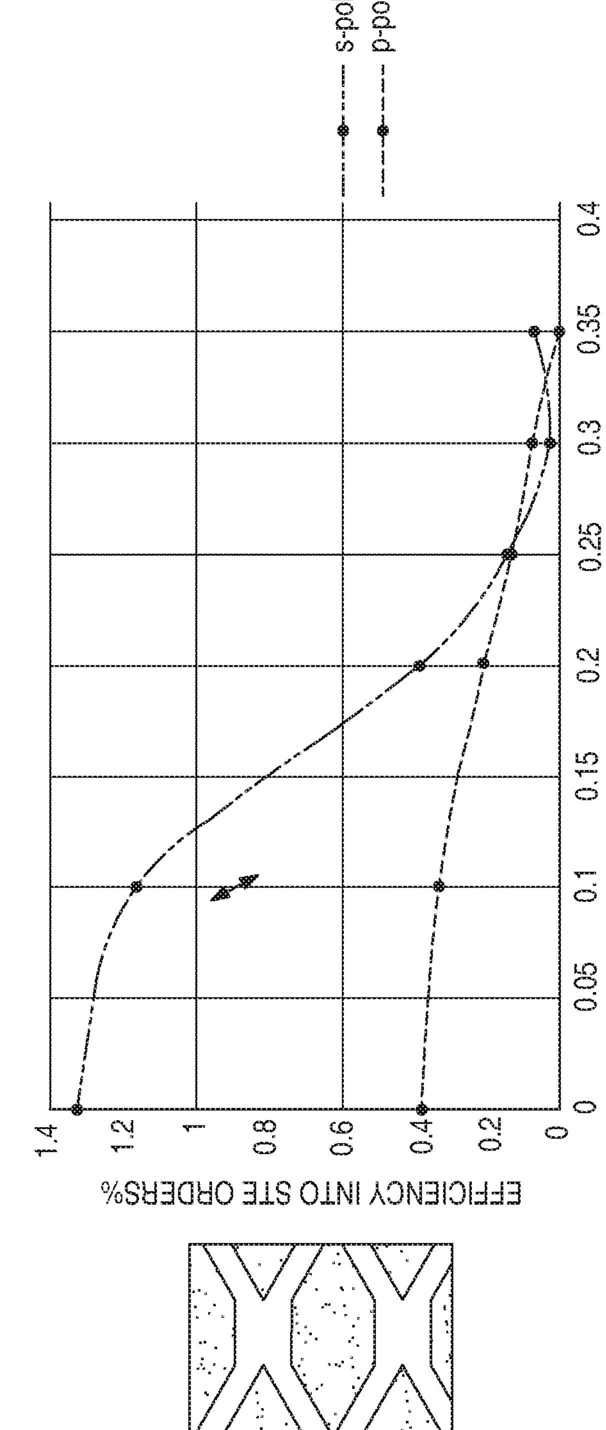
FIG. 7 is another graph showing how diffraction efficiency varies with flat sided width for an optical structure with another shape, in an embodiment of the invention.

FIG. 7 is a graph showing the efficiency with which light is coupled into the straight to eye order when it interacts with a photonic crystal 12, formed by an array of the third optical structures 30. The graph shows how the efficiency varies when the flat sided length 34 is varied (while maintaining symmetry in the x-axis and the y-axis). The efficiency is plotted for the s-polarisation and p-polarisation. In this graph the s-polarisation has the higher efficiency when the flat sided width is zero. It is noted that a flat sided width of zero would actually correspond to the simple parallelogram shape of the first optical structure 10. It can be seen that diffraction efficiency is reduced to a minimum when the flat sided width 34 is in the range of 0.25 to 0.35 of the lattice constant, p.

The invention claimed is:

1. A system, comprising:

a waveguide; and an output element of the waveguide, the output element including a plurality of discrete optical structures arranged in an array of a plurality of rows and columns to form a plurality of overlaid diffractive optical elements in or on the waveguide, the plurality of discrete optical structures and the plurality of overlaid diffractive optical elements arranged to receive light input into the waveguide from an input direction and to diffract a first portion of the received light that is input into the waveguide into diffraction orders that are further diffracted in a plane of the waveguide within the output element, and to diffract a second portion of the received light that is input into the waveguide into a diffraction order that is coupled out of the output element of the waveguide towards a viewer without the second portion of the received light internally reflecting in the waveguide, and the plurality of discrete optical structures having respective shapes in a plane view of the waveguide that include a plurality of substantially straight sides having respective angles relative to one another.

2. The system of claim 1, wherein each of the plurality of discrete optical structures is parallelogram shaped including four substantially straight sides.

3. The system of claim 2, wherein each of the parallelogram shaped discrete optical structures includes a pair of central notches.

4. The system of claim 1, wherein each of the plurality of discrete optical structures is embedded within the waveguide.

5. The system of claim 1, wherein each of the plurality of discrete optical structures has a different refractive index than a medium of the waveguide.

6. The system of claim 1 further comprising an input diffractive optical element separate from the plurality of discrete optical structures and the plurality of overlaid diffractive optical elements included in the output element, the input diffractive optical element to couple the light into the waveguide in the input direction to provide light to the plurality of discrete optical structures.

7. The system of claim 1, wherein the plurality of discrete optical structures and the plurality of overlaid diffractive optical elements receive the first portion of the received light from an input direction and diffract the first portion of the received light into diffraction orders that are further diffracted in two dimensions in the plane of the waveguide within the output element.

8. The system of claim 1, wherein the plurality of discrete optical structures are surface relief structures on a surface of the waveguide.

9. The system of claim 1, wherein each of the plurality of discrete optical structures includes substantially straight sides that are angled at substantially ±30° to the input direction.

10. A system, comprising:

a waveguide; and an output element of the waveguide, the output element including a plurality of discrete non-circular optical structures arranged in an array of a plurality of rows and columns to form a plurality of overlaid diffractive optical elements in or on the waveguide, the plurality of discrete non-circular optical structures and the plurality of overlaid diffractive optical elements arranged to receive light input into the waveguide from an input direction and to diffract a first portion of the received light that is input into the waveguide into diffraction orders that are further diffracted in two dimensions in a plane of the waveguide within the output element, and to diffract a second portion of the received light that is input into the waveguide into a diffraction order that is coupled out of the output element of the waveguide towards a viewer without the second portion of the received light internally reflecting in the waveguide.

11. The system of claim 10, wherein each of the plurality of discrete non-circular optical structures includes a plurality of substantially straight sides having respective angles relative to one another.

12. The system of claim 11, wherein each of the plurality of discrete non-circular optical structures has a shape of a parallelogram in the plane of the waveguide.

13. The system of claim 12, wherein the parallelogram of each of the plurality of discrete non-circular optical structures includes four main sides and further includes a pair of central notches, each central notch including two sides, each of these two sides being parallel to two of the four main sides.

14. The system of claim 10 further comprising an input diffractive optical element separate from the plurality of discrete non-circular optical structures and the plurality of overlaid diffractive optical elements included in the output element, the input diffractive optical element to couple the light into the waveguide in the input direction to provide light to the plurality of discrete non-circular optical structures.

15. The system of claim 10, wherein the plurality of discrete non-circular optical structures and the plurality of overlaid diffractive optical elements receive the first portion of the received light from an input direction and diffract the first portion of the received light into diffraction orders that are further diffracted in two dimensions in the plane of the waveguide within the output element.

16. The system of claim 10, wherein the plurality of discrete non-circular optical structures are surface relief structures on a surface of the waveguide.

17. A method, comprising:

providing an output element of a waveguide that comprises an array of discrete surface relief optical structures in a plurality of rows and columns on a surface of the waveguide, the discrete surface relief optical structures having a different refractive index than a medium surrounding the discrete surface relief optical structures to form a plurality of overlaid diffractive optical elements on the surface;

receiving light input into the surface of the waveguide from an input direction at the plurality of overlaid diffractive optical elements;

diffracting a first portion of the received light that is input into the surface of the waveguide through the plurality of overlaid diffractive optical elements into diffraction orders that are further diffracted in a plane of the waveguide within the output element; and diffracting a second portion of the received light that is input into the surface of the waveguide into a diffraction order that is coupled out of the output element of the waveguide towards a viewer without the second portion of the received light internally reflecting in the waveguide.

18. The method of claim 17, wherein the medium surrounding the discrete surface relief optical structures is air.

19. The method of claim 17 further comprising providing a coating on the array of discrete surface relief optical structures to control diffraction efficiency of the plurality of overlaid diffractive optical elements.

20. The method of claim 17 further comprising:

applying a bonding material on the array of discrete surface relief optical structures, the bonding material having a shape that is the same as a shape of the discrete surface relief optical structures and having an index of refraction that is different than an index of refraction of the waveguide; and attaching a cover piece to the waveguide through the bonding material, the cover piece having the same index of refraction as the waveguide.

* * * * *